May 16, 1967 D. ARMSTRONG, SR 3,319,455
APPARATUS FOR STRAIGHTENING METAL PANELS
Filed July 14, 1964

DALE ARMSTRONG, Sr.
INVENTOR.

BY

United States Patent Office 3,319,455
Patented May 16, 1967

3,319,455
APPARATUS FOR STRAIGHTENING
METAL PANELS
Dale Armstrong, Sr., 3524 1st Ave. N.
Texas City, Tex. 77590
Filed July 14, 1964, Ser. No. 382,590
6 Claims. (Cl. 72—458)

The present invention relates to an apparatus for use in straightening metal panels, especially panels such as fenders, doors or other portions of an automobile body, in order to restore their original contours and appearance. More particularly the apparatus of this invention is concerned with removing dents on the exterior of closed panels on automobile bodies without the necessity of first having to remove whatever material is carried on the interior side of the panel or without the necessity of having to remove the entire part to be straightened from the rest of the automobile body.

Inasmuch as the construction of the majority of automobile bodies is such that they become bent or deformed by contact with another vehicle or stationary object, there have been many tools provided for straightening and repairing the various body and fender panels and parts. Tools untilized for such purposes are of many styles becuase of the fact that straightening panels, fenders and other body parts vary from day to day and are difficult or easy depending on the exact nature of the demolished or dented area. However, there has been no tool provided for pulling outwardly on a deformed piece of metal, except for certain types of hydraulic devices, jerk hammers and other tools which have very limited flexibility and applicability. In certain areas of the vehicle body, and especially in door, fender and trunk panels, it is extremely difficult to gain access to the inner surface of the panels due to the various structural elements which are permanently formed in the panels. It is a matter of common knowledge that at the present time considerable manual labor and painstaking time and effort are consumed in the procedure of opening the back of the enclosed panel in order to expose the underneath side for purposes of straightening the dented portion to its original contour.

It is therefore an object of the present invention to provide a single apparatus which is capable of performing any straightening operation on the exterior body of any automobile. It is a further object of this invention to provide an apparatus which can be used to straighten automobile body parts and panels in a minimum amount of time and with a minimum amount of effort by utilizing leverage principles to perform the straightening operation. Another object of this invention is to provide an apparatus to be used in the straightening of automobile bodies which is so adjustable and versatile that no other tools are required for the straightening operation; and so simple to use that a relatively unskilled mechanic can carry out the operation. A still further object of the invention is to provide an apparatus to remove dents from automobile panels without the dismantling of the panel itself. Still another object of the present invention is to provide a simple, practical and economical device for the straightening of autombile bodies which will save time, reduce labor, effect a saving in money and result in a repair job which is quite as satisfactory as jobs following the usual and well known methods in the trade. These and other objects of the invention will become apparent from the following description, drawing and appended claims.

According to the present invention any part of an automobile body may be straightened by use of a combination apparatus which is comprised of an elongated shank, a lever arm adjustably located on said elongated shank, a pivot means either being part of said elongated shaft or being adjustably attached to said elongated shaft, a means for attaching said elongated shaft to a portion of an automobile body which requires straightening, the respective measurements of the apparatus being such that manual leverage can be used to straighten dented portions of said automobile body.

An important feature of this invention is the use of a sheet metal screw, threadedly connected to the dented portion of the auto body, and a self tightening claw hook used to grasp said screw, which when pulled by a chain or other connecting device attached to the elongated shank of the auto body straightening apparatus can easily pull out the bent or damaged portion of the automobile body. The surface can then be ground, the small holes filled and the surface reground so that the previously dented surface can be restored to its normal position and appearance and thus be ready for painting. In using the apparatus of this invention to carry out the steps of straightening a dent in an automobile body, a self threading screw is adapted to be threaded into a localizing and hold down hole provided in the dented portion of the auto body, the self tightening claw hook is attached to the screw, a chain or other connecting device is attached to the hook and to the elongated shaft of the apparatus, and the pivot means is set so that the lever arm or the elongated shaft itself can then manually be pulled or pushed, as the case may be, to pull out the section of the automobile body which is inwardly dented.

A preferred embodiment of the apparatus of the present invention is shown in the drawing but it should be understood that the same is susceptible of substantial modification and change without parting from the scope of the invention.

Figure 1:
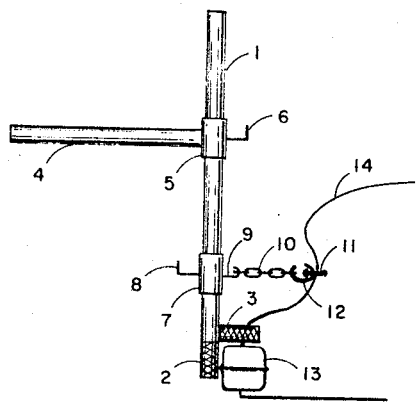
FIGURE 1 shows the apparatus of this invention using one end of the elongated shaft as a pivot means to pull out the back of a fender or trunk of an auto body.

Now referring to FIGURE 1 the apparatus of the present invention is shown in use to pull out a dented portion of the rear or front fender, trunk or front grill of an automobile body. In this figure, the apparatus consists of elongated shank 1 with one end 2 and side arm 3 covered with a padding material so that the angle formed by the end and side arm might act as the pivot point as shown in FIGURE 1 without scarring the automobile bumper. Lever arm 4 is adjustably attached to elongated shank 1 by means of sleeve 5 and set screw 6 which allows lever arm 4 to be moved up and down on elongated shank 1 to any desired position. Sleeve 7 is adjustably attached to elongated shank 1 and includes hook 9 and set screw 8 so that it may be moved up and down on elongated shank 1 to any desired position. Attached to hook 9 is chain 10 and claw-hook 12, designed to pull on sheet metal screw 11 which is threadedly connected to the dented portion of automobile body 14 to thereby pull out the dented portion when a downward force on lever arm 4 or a backward force on the top of elongated shank 1 is exerted.

Figure 2:
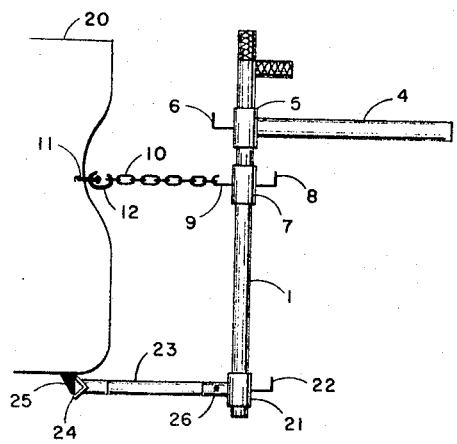
FIGURE 2 shows the apparatus of the present invention as it would be used to pull out the side or door panel of an auto body using a part of the automobile underneath the body and a rigid shaft as a pivot means.

Referring now to FIGURE 2, elongated shank 1 is shown in an upside down position as compared with that shown in FIGURE 1. Lever arm 4 and sleeve 7 with hook 9, chain 10, claw-hook 12, and sheet metal screw 11 are identical to those shown in FIGURE 1 but are located at different positions of elongated shank 1. Sheet metal screw 11 is threadedly connected to the dented portion of automobile body 20 and pulls out the dented portion when a downward force on lever arm 4 is applied. In FIGURE 2 the pivot means is brace 25 underneath the bottom of automobile body 20, flange 24 and connecting arm 23 attached to elongated shank 1 by means of sleeve 21 and fixed in the appropriate location on elongated shank 1 by means of set screw 22. The pivot pint of said pivot means is hinge 26.

Figure 3:
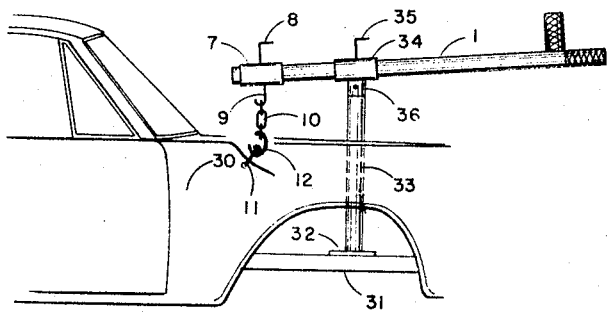
FIGURE 3 shows the apparatus of this invention when used to pull out a panel section of the top hood of an automobile using a rigid section in the middle of the elongated shaft as a pivot means and using the elongated shaft itself as the leverage arm.

Referring now to FIGURE 3, the apparatus of this invention is shown in the appropriate position when removing a dent from the top hood section of automobile body 30 by using sheet metal screw 11, claw-hook 12, chain 10, hook 9 and sleeve 7 as the pulling means on the extreme end of elongated shank 1 with the pivot point located in approximately the middle of elongated shank 1. The pivot point 36 is supported by means of sleeve 34 and set screw 35. Pivot point 36 is supported by rigid connecting rod 33 which rests on base 32 and automobile frame 31. The dented portion of automobile body 30 is pulled out by a downward leverage force on the padded end of elongated shank 1.

Figure 4:
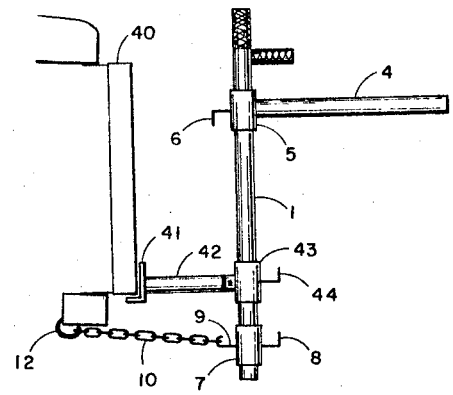
FIGURE 4 shows the apparatus of the present invention when used to bend or adjust a door of an automobile to its proper closing position wherein a section of chain hooked underneath the automobile body is used as a pivot means.

Referring now to FIGURE 4, the apparatus of the present invention is shown as a tool to straighten an automobile body door to its original closing position. The leverage principle shown in FIGURES 1, 2 and 3 is utilized with the combination of claw-hook 12, chain 10, hook 9, and sleeve 7 as the pivot means at the extreme end of elongated shank 1 and force applied to lever arm 4 used to apply leverage through connecting arm 42 and flange 41 to auto door 40. The force applied to plate 41 pushes inward and aligns automobile door 40 to its original position when manually applying force inward on elongated shank 1 and upward on lever arm 4.

Figure 5:
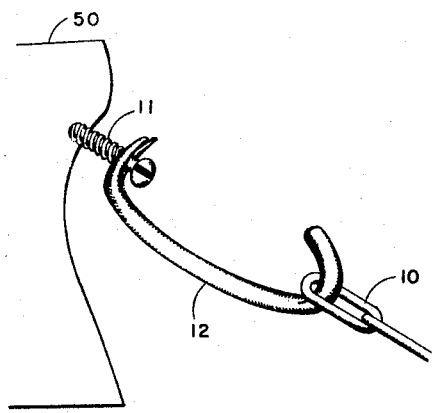
FIGURE 5 shows the sheet metal screw and claw hook with a chain used as the connecting means.

Referring now to FIGURE 5, claw-hook 12 is shown in greater detail. Sheet metal screw 11 is threadedly connected to the dented portion of automobile body 50 and claw-hook 12 then fits over the head of sheet metal screw 11 in a self-tightening grasp with chain 10 being attached to the other end of claw-hook 12 as the pulling means. Force on chain 10 tightens the claw grip on sheet metal screw 11 thereby eliminating any possibility of claw-hook 12 releasing sheet metal screw 11.

The applications shown and described are only illustrative of the use of the apparatus of this invention since it would be impossible to show and describe all of the possible uses. With its rapid and complete adjustability, the apparatus is so versatile that it can perform on any automobile, any straightening operation on dented portions of the automobile body which can be accomplished by leverage action. It can be adjusted to fit any desired angle and any contour or construction of automobile body or grill and can be used as well for other straightening operations. Further, since numerous modifications and changes will readily occur to those skilled in the art, it is not desired to limit the invention to the exact construction and operation shown and described, and accordingly all suitable modifications and equivalents may be resorted to, all falling within the scope of this invention.

What is claimed:

1. A metal panel straightening apparatus comprising an elongated shank having on an extreme end thereof a section covered with non-abrading material for use as a comfortable and non-slipping hand hold and as a non-scratchable area when in contact with a finished metal surface; at least two sleeves slidably connected to said elongated shank both of said sleeves being adjustable along the entire length of said elongated shank, one of said sleeves having a flexible and collapsible member and a means for attaching said flexible and collapsible member to said metal panel to be straightened, said means including a claw-hook and sheet metal screw; pivot means around which said elongated shank is rotated; and means for applying manual leverage to said elongated shank to move it around said pivot point and thereby straighten said metal panel.

2. A metal panel dent straightening apparatus comprising a manually operated elongated lever having near one end thereof a right angle member being covered with a non-abrading material; at least two sleeves adjustably connected to said elongated lever, one of said sleeves having a flexible member and a claw-hook and sheet metal screw for attaching said flexible member to said metal panel, said sheet metal screw being threadedly connected to said metal panel; another of said sleeves having a lever arm attached rigidly thereto for applying manual leverage and pivoting said elongated lever around a pivot point; and pivot means around which said elongated lever is rotated.

3. The apparatus of claim 2 wherein said pivot means includes a sleeve adjustably attached to said elongated lever and a rigid rod connected to said sleeve by a hinge means to permit said rigid rod to pivot on said sleeve longitudinally to said elongated lever.

4. The apparatus of claim 1 wherein said pivot means is said covered end section of said elongated shank.

5. The apparatus of claim 1 wherein said pivot means includes a sleeve adjustably attached to said elongated shank with a rigid rod connected to said sleeve by a hinge means to permit said rigid rod to pivot on said sleeve longitudinally to said elongated shank.

6. The apparatus of claim 4 wherein said means for applying maunal leverage to said elongated shank to move it around said pivot point includes a sleeve adjustably attached to said elongated shank and a lever rod rigidly connected to said sleeve so that no motion is permitted between said sleeve and said lever rod.

References Cited by the Examiner
UNITED STATES PATENTS

| | | | |
|---|---|---|---|
| 2,749,795 | 6/1956 | Boykin | 72—458 |
| 2,852,971 | 9/1958 | Macaluso | 72—458 |
| 3,091,983 | 6/1963 | Kliss | 72—458 |

CHARLES W. LANHAM, *Primary Examiner.*

G. P. CROSBY, *Assistant Examiner.*